United States Patent
Robbins

(10) Patent No.: US 10,881,119 B2
(45) Date of Patent: Jan. 5, 2021

(54) ORANGE AND RED ANTHOCYANIN-CONTAINING COLORANTS

(71) Applicant: MARS, INCORPORATED, McLean, VA (US)

(72) Inventor: Rebecca J. Robbins, Hackettstown, NJ (US)

(73) Assignee: Mars, Incorporated, McLean, VA (US)

(*) Notice: Subject to any disclaimer, the term of this patent is extended or adjusted under 35 U.S.C. 154(b) by 492 days.

(21) Appl. No.: 14/908,882

(22) PCT Filed: Jul. 31, 2014

(86) PCT No.: PCT/US2014/049020
§ 371 (c)(1),
(2) Date: Jan. 29, 2016

(87) PCT Pub. No.: WO2015/017605
PCT Pub. Date: Feb. 5, 2015

(65) Prior Publication Data
US 2016/0165940 A1 Jun. 16, 2016

Related U.S. Application Data

(60) Provisional application No. 61/861,641, filed on Aug. 2, 2013.

(51) Int. Cl.
| A23G 3/34 | (2006.01) |
| A23G 3/32 | (2006.01) |
| A23G 3/42 | (2006.01) |
| A23P 20/10 | (2016.01) |
| A23L 5/43 | (2016.01) |
| A23G 3/54 | (2006.01) |

(52) U.S. Cl.
CPC .............. *A23G 3/343* (2013.01); *A23G 3/32* (2013.01); *A23G 3/42* (2013.01); *A23G 3/54* (2013.01); *A23L 5/43* (2016.08); *A23P 20/10* (2016.08); *A23V 2002/00* (2013.01)

(58) Field of Classification Search
CPC ........ A23G 3/0095; A23G 3/32; A23G 3/343; A23G 3/42; A23G 3/54; A23L 5/40; A23L 5/43; A23P 20/10
USPC ........................................................ 426/103
See application file for complete search history.

(56) References Cited

U.S. PATENT DOCUMENTS

| 6,939,572 | B2 | 9/2005 | Nguyen | |
| 8,048,470 | B2 * | 11/2011 | Overly, III | ............... A23G 3/42 426/516 |
| 9,687,807 | B2 | 6/2017 | Huynh | |
| 2005/0181101 | A1 | 8/2005 | Harada et al. | |

FOREIGN PATENT DOCUMENTS

| JP | H09154532 A | 6/1997 | |
| JP | 2001329186 A | * 11/2001 | |
| JP | 2006291075 A | 10/2006 | |
| JP | 2007077202 A | 3/2007 | |
| JP | 2010130992 A | 6/2010 | |
| WO | WO 2004/080193 A1 | 9/2004 | |
| WO | WO 2011/065977 A1 | 6/2011 | |
| WO | WO-2012033536 A2 * | 3/2012 | ............... A23L 2/58 |
| WO | WO 2012/059590 A1 | 5/2012 | |
| WO | 2012172429 A2 | 12/2012 | |

OTHER PUBLICATIONS

Supplementary European Search Report dated Feb. 21, 2017 in Application No. EP 14832980.
U.S. Appl. No. 14/908,976, filed Jan. 29, 2016.
International Search Report and Written Opinion of the International Searching Authority, dated Nov. 13, 2014 in International Application No. PCT/US2014/049020.
International Search report dated Nov. 13, 2014 in International Application No. PCT/US2014/049023.
Kharlamova O.A. et al. <<Naturalnye pischevye krasiteli», M., «Pischevaya promyshlennost», 1979, s. 17, paragraph 3.
Bolotov et al., "Coloring of Particular Groups of Food Products," 2008, St. Petersburg, RU, 5 pages.
Beckett, "Chocolate Panning", Industrial Chocolate Manufacture and Use, 3rd Edition, 1999, pp. 288-289.
Colorhexa, Color Information #140a09 hex color, 2012, 3 pages, https://www.colorhexa.com/140a09.
Colorhexa, Color Information #ead2ce hex color, 2012, 3 pages, https://www.colorhexa.com/ead2ce.
Elizabeth Mannie, Prepared Foods-Formulating with Natural Colorings, Prepared Foods, Feb. 2011, 8 pages, NA.
Evoluted New Media, "The good, the bad and the colourful," Laboratory News, Feb. 17 2011, 6 pages.
Giusti et al., "Characterization of Red Radish Anthocyanins", J. Food Science, Mar. 1996, 5 pages, vol. 61, No. 2.
Our Food, Food ingredients, Updated Jan. 2012, 4 pages.
Smarties, Wikipedia—Smarties, Dec. 16, 2019, 5 pages.
UK Nestle Smarties, Transition to Natural Colours, 1 page.
Typical Smarties Shell—Close Up, Smarties Shell, 1 page.
Nestle, Nestle Confectionery UK removes all artificial colours, flavours and preservatives from its products, www.nestle.co.uk/en-gb/media/pressreleases, Mar. 1, 2012, 6 pages, Nestle UK Press Release, GB.
Notice of Opposition, EP Application No. 14832980.8, Mar. 4, 2020, 11 pages.
Bridle et al., "Anthocyanins as natural food colours-selected aspects," Food Chemistry 58(1-2):103-109 (1997).
Chapman et al., "Guidelines on Approaches to Replacement," Mar. 2011, 38 pages, FMT/21810/1, Campden BRI, GB.

* cited by examiner

Primary Examiner — Jyoti Chawla

(57) ABSTRACT

The present application is directed to a method of hard pan coating an edible core, a sucrose-based, hard panned coating, and a hard panned confection comprising an edible core coated with the same. The sucrose-based, hard panned coating comprises sucrose and a pH-adjusted red radish anthocyanin-containing colorant, is substantially crystalline, and has a red or orange hue described by a CIELCH color space h° coordinate of from about 15° to about 70°. In some embodiments, the coating further comprises a yellow colorant. The colorants are desirably naturally sourced to provide alternatives to synthetic colorants for coloring hard panned confectionery coatings in red or orange hues.

12 Claims, No Drawings

ORANGE AND RED ANTHOCYANIN-CONTAINING COLORANTS

CROSS-REFERENCE TO RELATED APPLICATION

This application is a U.S. National Stage Patent Application under 35 U.S.C. § 371 of International Application No. PCT/US2014/049020 filed on Jul. 31, 2014, which claims priority to U.S. Application Ser. No. 61/861,641 filed Aug. 2, 2013, each of which is incorporated by reference in its entirety herein, and priority to each of which is claimed.

TECHNICAL FIELD

The present application relates to a hard panned coating, a hard panned confection coated with the same, and a method of hard pan coating an edible core with the same.

BACKGROUND ART

Confectionery products enjoyed by consumers include products having a confectionery or other edible center that is coated with a sucrose-based coating by the process of hard panning.

It is known that the color of a food product can convey many different product attributes to the consumer, such as good taste, quality, freshness, and even a sense of fun. Since the coating is the first component of a hard panned confectionery that a consumer sees, it is desirable to use colorants in the coating which convey the desired product attributes.

However, in using colorants in the coating, it is often technically challenging to provide a desired hue while also delivering other coating attributes such as a target texture, taste, and stability to environmental factors. Therefore, a coating which delivers both a desired hue and other target attributes can expand the variety of hard panned confectioneries that can be made for the consumer's enjoyment.

BRIEF DESCRIPTION

The present application is directed to a sucrose-based, hard panned coating comprising sucrose and a pH-adjusted red radish anthocyanin-containing colorant, wherein the coating is substantially crystalline and has a red or orange hue described by a CIELCH color space h° coordinate from about 15° to about 70°. In an embodiment, the red radish anthocyanin-containing colorant is pH adjusted in aqueous solution to a pH of from about 4 to about 6 and the water content of the solution is optionally reduced to provide the pH-adjusted red radish anthocyanin-containing colorant. In another embodiment, the coating further comprises a yellow colorant.

In one embodiment, the sucrose-based, hard panned coating comprises multiple sucrose-based syrup layers, and the pH-adjusted red radish anthocyanin-containing colorant is present in at least one of the sucrose-based syrup layers. In this embodiment, the coating may further comprise a yellow colorant. In some embodiments of the multilayered coating further comprising a yellow colorant, the yellow colorant is present in one or more of the same sucrose-based syrup layers as the pH-adjusted red radish anthocyanin-containing colorant.

In some embodiments, the color of the sucrose-based, hard panned coating has a ΔE color difference of 10 or less compared to the color of a sucrose-based, hard panned coating colored with the synthetic red colorant, FD&C Red No. 40.

The present application is also directed to a hard panned confection comprising an edible core and a sucrose-based, hard panned coating comprising sucrose and a pH-adjusted red radish anthocyanin-containing colorant, wherein the coating is substantially crystalline and has a red or orange hue described by a CIELCH color space h° coordinate from about 15° to about 70°. Any of the embodiments of a sucrose-based, hard panned coating disclosed herein may be used as the coating of the hard panned confection. In embodiments, the coating substantially surrounds the edible core.

In another aspect, the present application is directed to a method of hard pan coating an edible core. The method comprises: (a) admixing a red radish anthocyanin-containing colorant with water to form an aqueous colorant solution; (b) adjusting the pH of the aqueous colorant solution to from about 4 to about 6, and, optionally, reducing the water content of the solution to form a pH-adjusted colorant; (c) admixing the pH-adjusted colorant with a sucrose-based syrup to form a colored sucrose-based syrup; (d) admixing a yellow colorant with one or more constituents and admixtures of steps (a), (b), and (c) such that the yellow colorant is incorporated into the colored sucrose-based syrup; and (e) applying the colored sucrose-based syrup to an edible core to provide at least one layer of a hard panned coating. In some embodiments, the pH of the aqueous colorant solution is adjusted by admixing a food-grade pH adjusting agent with the solution.

The method of hard pan coating, in one embodiment, may further comprise crystallizing the colored sucrose-based syrup after it is applied such that the at least one layer of the hard panned coating is substantially crystalline. In another embodiment, the method may further comprise applying the colored sucrose-based syrup to the edible core to provide multiple layers of a hard panned coating.

DETAILED DESCRIPTION

Definitions

The present specification provides certain definitions related to the compositions and methods disclosed. Provision, or lack of the provision, of a definition for a particular term or phrase is not meant to imply any particular importance, or lack thereof. Rather, and unless otherwise noted, terms are to be understood according to conventional usage by those of ordinary skill in the relevant art.

Reference throughout the specification to "one embodiment" or "an embodiment" means that a particular feature, structure, or characteristic described in connection with an embodiment is included in at least one embodiment. Thus, the appearance of the phrases, "in one embodiment" or "in an embodiment," in various places throughout the specification is not necessarily referring to the same embodiment. Further, the particular features, structures, or characteristics may be combined in any suitable manner in one or more embodiments.

The present application contemplates the possibility of omitting any components or steps listed herein. The present application further contemplates the omission of any components or steps even though they are not expressly named as included or excluded in the specification.

As used herein, "comprising" and "comprises" denote the presence of a feature, step, or component without excluding the possibility of additional features, steps, or components being present as well.

As used herein, a "sucrose-based syrup" means a syrup comprising at least 90 percent by weight of a base composition having about 60 wt % to about 80 wt % sucrose solids and about 40 wt % to about 20 wt %, i.e., the balance, water; and the syrup optionally comprising non-colorant components in a total amount not exceeding 10 percent by weight of the combined base composition and non-colorant components. In some embodiments, sucrose may be the sole carbohydrate in the sucrose-based syrup, or sucrose may be the sole crystallizable carbohydrate in the sucrose-based syrup. Non-colorant components include white or light-colored materials such as titanium dioxide and calcium carbonate when they are used as an opacifier in the coating. One or more colorants may be combined with the sucrose-based syrup to produce a "colored sucrose-based syrup." Colorants may include white or light-colored materials such as titanium dioxide and calcium carbonate when they are used to produce a white or light colored coating.

A "sucrose-based, hard panned coating" is a coating produced by a hard panning process with one or more sucrose-based syrups, with or without colorant(s) added. Conventional hard panning involves mixing edible centers in a rotating pan, rotating drum, moving belt system or similar apparatus while applying multiple applications of one or more sucrose-based syrups to the surfaces of the centers. The process includes introducing a drying gas, such as air, into the pan to dry the coating between applications of sucrose-based syrups. Drying removes water from the sucrose-based syrup and results in crystallization of a substantial portion of the sucrose. Therefore, a sucrose-based, hard panned coating is substantially crystalline. Hard panning produces a panned confectionery with a smooth, hard coating and a crunchy texture when bitten. The hard panned coating is distinguished herein from a soft panned coating, at least in part because it does not have the soft consistency and texture of a soft panned coating. Alternatively, a sucrose-based, hard panned coating may be prepared by a non-conventional process that substantially replicates the properties of a conventionally hard panned coating.

As used herein, a "colorant" is any substance that imparts color by absorbing or scattering light at different wavelengths. A "food-grade colorant" refers to a colorant suitable for use in a food product intended for human or animal consumption, and is differentiated from a nontoxic material that may provide color, but is generally not included in a food product or is only included in a trace amount. The term, "natural colorant," includes colorants that exist in or are produced by nature or are sourced therefrom.

A "red radish anthocyanin-containing colorant" is a colorant comprising anthocyanin(s) sourced from red radish or of the type(s) that may be sourced from red radish.

"Hue" refers to the color property that gives a color its name, for example, red, orange-red, blue, violet, etc. "Chroma" is a color property indicating the purity of a color, where higher chroma is associated with greater purity of hue and less dilution by white, gray, or black. "Value" is a color property indicating the lightness or darkness of a color, where higher value is associated with greater lightness.

The terms "color" and "color characteristics" are used interchangeably, and encompass color properties such as hue, chroma, and value, and color model system parameters used to describe these properties, such as Commission Internationale de l'Eclairage CIE 1976 CIELAB color space L*a*b* values and CIELCH color space L*C*h° values. The CIELAB and CIELCH color models provide more perceptually uniform color spaces than earlier color models. Colorants are analyzed with a spectrophotometer, and CIELAB L*a*b* and CIELCH L*C*h° values are calculated from the spectral data. The L*a*b* and L*C*h° values provide a means of representing color characteristics and assessing the magnitude of difference between two colors.

L*a*b* values consist of a set of coordinate values defined in a three-dimensional Cartesian coordinate system. L* is the value, or lightness, coordinate. L* provides a scale of lightness from black (0 L* units) to white (100 L* units) on a vertical axis. a* and b* are coordinates related to both hue and chroma. a* provides a scale for greenness (−a* units) to redness (+a* units), with neutral at the center point (0 a* units), on a horizontal axis. b* provides a scale for blueness (−b* units) to yellowness (+b* units), with neutral at the center point (0 b* units), on a second horizontal axis perpendicular to the first horizontal axis. The three axes cross where L* has a value of 50 and a* and b* are both zero.

L*C*h° values consist of a set of coordinate values defined in a three-dimensional cylindrical coordinate system. L* is the value, or lightness, coordinate. L* provides a scale of lightness from black (0 L* units) to white (100 L* units) on a longitudinal axis. h° is the hue coordinate. h° is specified as an angle from 0° to 360° moving counterclockwise around the L* axis. Pure red has a hue angle of 0°, pure yellow has a hue angle of 90°, pure green has a hue angle of 180°, and pure blue has a hue angle of 270°. The C* coordinate represents chroma and is specified as a radial distance from the L* axis. C* provides a scale from achromatic, i.e., neutral white, gray, or black, at the L* axis (0 C* units) to greater purity of hue as the coordinate moves away from the L* axis (up to 100 or more C* units). C* and h° can be calculated from a* and b* using Equations 1 and 2:

$$C^* = (a^{*2} + b^{*2})^{0.5} \tag{1}$$

$$h^\circ = \arctan\left(\frac{b^*}{a^*}\right) \tag{2}$$

"Delta E," "ΔEab*," or "ΔE" is a measure of the magnitude of total color difference between two colors represented in CIELAB L*a*b* color space. It has been reported that an experienced color observer cannot distinguish any difference between two colors when the ΔE is about 2.3 or less. The ΔE of two different colors with L*a*b* values, L*ia*ib*i and L*2a*2b*2, is calculated using Equation 3:

$$\Delta E_{ab}^* = \sqrt{(L^*_1 - L^*_2)^2 + (a^*_1 - a^*_2)^2 + (b^*_1 - b^*_2)^2} \tag{3}$$

The CIELAB L*a*b* and CIELCH L*C*h° values of hard panned confections presented herein, in all instances unless stated otherwise, were calculated from spectral data obtained with a Konica Minolta Spectrophotometer CM-3500d operated in reflectance mode, with CIE Standard Illuminant D65 and 10° observer angle.

Description

An edible, food-grade colorant is often included in one or more sucrose-based syrup layers of a hard panned confectionery coating. Many edible, food-grade, synthetic colorants are available for effectively coloring hard panned confectionery coatings. However, although synthetic colorants have enjoyed consumer acceptance for a number of years, alternatives are desired that may appeal to consumers as being naturally sourced.

There are a number of edible, food-grade colorants available that are described as 'natural.' Among these are natural anthocyanin-containing colorants, including those provided in the form of anthocyanin-containing vegetable and fruit juices and extracts.

Color characteristics of anthocyanin-containing vegetable and fruit juices and extracts can change as a result of changing pH. Anthocyanin-containing juices and extracts generally exhibit red hues at low pH, e.g., in the pH range of about 1 to about 3, and the hue shifts to purple as the pH is increased.

Sucrose-based syrups used for hard panning, however, generally have a pH of about 5 to about 8, with the low end of this range only tolerated at higher syrup temperatures. Operating outside of this pH range can result in inversion of the sucrose, which makes the syrup unsuitable for panning. Coating defects that occur when the pH of the syrup is outside this range can include a bumpy, irregular surface and blotchy, nonuniform coloration. Therefore, effective colorants added to sucrose-based syrups desirably do not drive the pH of the syrup above or below this range.

Currently, commercially available anthocyanin-containing colorants have not been found to provide a red hue in a sucrose-based syrup or a hard panned coating produced with the syrup. Instead, the sucrose-based syrup and resulting coating take on a violet hue. Furthermore, combinations of an anthocyanin-containing colorant and a yellow colorant have not been found to provide a red or orange hue in the sucrose syrup or resulting coating, but result in a muddy, brownish hue. It is noted that commercially available colorants used to provide red and orange hues, such as lycopene, β-carotene, carmine, and betalains are not anthocyanin-containing colorants. Accordingly, a natural anthocyanin-containing colorant is needed that can be used to provide red and orange hues in a pH range that is conducive to hard pan coating with sucrose-based syrups.

It has surprisingly been found that a sucrose-based, hard panned coating with a red or orange hue may be prepared when using a pH-adjusted red radish anthocyanin-containing colorant obtained by pH-adjusting a red radish anthocyanin-containing colorant in aqueous solution to a pH of from about 4 to about 6. That is, incorporating such a pH-adjusted red radish anthocyanin-containing colorant into a sucrose-based syrup does not result in, for example, a violet or muddy brown hue in a hard panned coating prepared with the syrup. The potential for a red radish anthocyanin-containing colorant in this pH range to contribute to providing red and orange hues in a sucrose-based, hard panned coating has not previously been appreciated in the art.

A publication entitled, "Radish Anthocyanin Extract as a Natural Red Colorant for Maraschino Cherries," Journal of Food Science, 61: 688-694, 1996, Giusti et al., discloses the use of red radish anthocyanin extracts in pH 3.5 high fructose corn syrups for coloring maraschino cherries. This is outside the pH range of colored sucrose-based syrups used for coating edible cores, and the reference does not disclose the use of the syrups for coloring sucrose-based, hard panned coatings. In addition, the disclosed methods do not include a step of preparing a pH-adjusted red radish anthocyanin-containing colorant for admixing with a sucrose-based syrup to form a colored sucrose-based syrup.

WO 2012/059590 A1, Mason et al., discloses the preparation of sucrose syrups colored with red radish anthocyanin materials and the use of these syrups to produce a hard panned coating on an edible center. The disclosed methods do not include a step of preparing a pH-adjusted red radish anthocyanin-containing colorant for admixing with a sucrose-based syrup to form a colored sucrose-based syrup. The resulting coatings have measured hue angles, h°, of 356 and 13.3, which are outside the range of h° values disclosed herein for producing red or orange hues in a sucrose-based, hard panned coating.

A method for improving the heat-resistance of anthocyanin pigments is disclosed in US 2005/0181101 A1, Harada et al. In an example, an aqueous solution of a red radish pigment is alkali treated and heated at a temperature of 90° C. for one hour. The treated pigment is reportedly suitable for coloring foods which undergo a heating step at a pH of less than 4. This is outside the pH range of colored sucrose-based syrups used for coating edible cores, and the reference does not disclose the use of the treated pigment for coloring sucrose-based, hard panned coatings with red or orange hues.

In one embodiment of the present application, a sucrose-based, hard panned coating is provided. The coating comprises sucrose and a pH-adjusted red radish anthocyanin-containing colorant. The coating is substantially crystalline and has a red or orange hue described by a CIELCH color space h° coordinate of from about 15° to about 70°.

As a base material for the pH-adjusted red radish anthocyanin-containing colorant, a red radish anthocyanin-containing colorant is a composition that may comprise only anthocyanin(s) from red radish or may also include other components. In embodiments where the red radish anthocyanins are naturally sourced, an anthocyanin-containing juice or extract of red radish may be used as a source of anthocyanin(s) for a natural red radish anthocyanin-containing colorant. The red radish raw material for obtaining the juice or extract may desirably be a red-fleshed vegetable of the plant family, Brassicaceae, and genus, *Raphanus*. An anthocyanin-containing juice of red radish is obtained by pressing liquid out of the red radish. An anthocyanin-containing extract of red radish is obtained by washing macerated red radish with a solvent (e.g., water, alcohol). Juices and extracts of red radish contain anthocyanins as well as many other naturally occurring compounds, including, for example, carbohydrates, acids, flavonoids, metal ions, phenolic acids, phenolic acid esters, and vitamins. Accordingly, suitable juices and extracts of red radish may be processed, for example, by deodorizing, reconstituting, or subjecting the juice or extract to other processes for removing specific or broad classes of compounds. This processing may reduce a potential negative impact of a non-anthocyanin compound on the red or orange hue provided by the red radish anthocyanin-containing colorant. In some embodiments, the red radish anthocyanin-containing colorant comprises non-anthocyanin compounds in an amount of less than about 10 wt %, or less than about 5 wt %, or less than about 3 wt %, or less than about 2 wt %, or less than about 1 wt %, or less than about 0.5 wt %, or less than about 0.1 wt %. In other embodiments, the red radish anthocyanin-containing colorant comprises non-anthocyanin compounds in an amount of from about 0.01 wt % to about 10 wt %, or from about 0.01 wt % to about 5 wt %, or from about 0.01 wt % to about 3 wt %, or from about 0.01 wt % to about 2 wt %, or from about 0.01 wt % to about 1 wt %, or from about 0.01 wt % to about 0.5 wt %, or from about 0.01 wt % to about 0.1 wt %. Cell culture and fermentation methods may also provide raw materials for naturally sourcing red radish anthocyanins.

In an embodiment, the red radish anthocyanin-containing colorant is free of synthetic red colorants, lycopene, β-carotene, carmine, and betalains. In another embodiment, the red radish anthocyanin-containing colorant is free of colorants capable of providing a red hue other than red radish anthocyanins.

The red radish anthocyanin-containing colorant may take the form of a solid, e.g., a powder; a semi-solid, e.g., a paste; or a liquid, e.g., a solution or dispersion. The colorant is preferably provided in a form that is soluble or dispersible in water and in a sucrose-based syrup.

In some embodiments, the red radish anthocyanin-containing colorant is pH adjusted in aqueous solution to a pH of from about 4 to about 6 to create a pH-adjusted red radish anthocyanin-containing colorant. The pH range of from about 4 to about 6 is targeted because it is the range at which the red radish anthocyanins exhibit desired components of the red and orange hues sought in the hard panned coating. In some of these and other embodiments, the pH-adjusted aqueous solution of red radish anthocyanin-containing colorant has a pH value of from about 4.25 to about 6, or from about 4.5 to about 6, or from about 4.75 to about 6, or from about 5 to about 6.

In some embodiments, a red radish anthocyanin-containing colorant in any form is admixed with water to create an aqueous colorant solution. The water with which the red radish anthocyanin-containing colorant is admixed may desirably be reduced in ion content or deionized. If the pH of the aqueous colorant solution is outside the range of from about 4 to about 6, the pH is adjusted to from about 4 to about 6 to create a pH-adjusted red radish anthocyanin-containing colorant in the form of an aqueous solution. If pH adjustment of the aqueous colorant solution is desired or required, it is accomplished by admixing a food-grade pH adjusting agent with the solution in an amount necessary to adjust the pH of the solution to from about 4 to about 6. The pH adjusting agent may be provided in any water-soluble form, e.g., as solid particles or in aqueous solution. If the pH adjusting agent is provided in aqueous solution, the water of solution is desirably reduced in ion content or deionized in some embodiments.

The food-grade pH adjusting agent, in an embodiment, is a strong base which substantially dissociates in water; that is, the percent dissociation of the agent in water is at least about 95%, or at least about 96%, or at least about 97%, or at least about 98%, or at least about 99%, or from about 95% to about 99.99%, or from about 98% to about 99.99%. The strong base does not act as a buffer, but substantially dissociates and adjusts the pH of the aqueous colorant solution. In some embodiments, the pH adjusting agent which is a strong base is admixed with the aqueous colorant solution in an amount of from about 0.5 wt % to about 10 wt %, where the weight percentage of the agent is by weight of the red radish anthocyanin-containing colorant. In other embodiments, the amount of the pH adjusting agent is from about 0.5 wt % to about 8 wt %, or from about 0.5 wt % to about 6 wt %, or from about 0.5 wt % to about 5 wt %, or from about 1 wt % to about 6 wt %, or from about 2 wt % to about 5 wt %, where the weight percentage of the agent is by weight of the colorant.

The strong bases, sodium hydroxide and potassium hydroxide, are preferred food-grade pH adjusting agents, in particular embodiments, because of their ability to adjust the pH of the aqueous colorant solution without contributing noticeable odor or flavor and without interacting with the colorant in a way that shifts hue away from the intended target. In a preferred embodiment, the food-grade pH adjusting agent is sodium hydroxide.

The pH adjustment of the red radish anthocyanin-containing colorant in aqueous solution simplifies the production of a colored sucrose-based syrup for hard panning by providing a complete coloring material for admixing with an uncolored syrup. That is, provision of the pH-adjusted colorant avoids the need to adjust the pH of the bulk colored syrup to make it suitable for hard panning. As a result, the production of the sucrose-based, hard panned coating is streamlined.

In one embodiment where a pH-adjusted red radish anthocyanin-containing colorant is first created in the form of an aqueous solution, the water content is then reduced to create a pH-adjusted red radish anthocyanin-containing colorant in the form of a semi-solid or solid. The water content of the pH-adjusted solution may be reduced by any suitable process, e.g., a drying process or a separations process. The resulting pH-adjusted semi-solid or solid colorant is used to color an uncolored sucrose-based syrup for hard panning without the necessity of pH adjustment of the bulk colored syrup. The pH-adjusted red radish anthocyanin-containing colorant, in any form, is preferably soluble or dispersible in water and in a sucrose-based syrup.

The amount of the red radish anthocyanin-containing colorant to be used in making the sucrose-based, hard panned coating is limited only by practicality; for example, enough should be used so that the desired coating hue is obtained, but desirably, no greater amount will be used than that needed to achieve the same. Suitable concentrations of the red radish anthocyanin-containing colorant in a colored sucrose-based syrup used to prepare the coating can range from about 0.01 wt % to about 20 wt %, or from about 0.05 wt % to about 15 wt %, or from about 0.1 wt % to about 10 wt %. In embodiments where the colorant has low coloring power, the colorant may be used at concentrations from about 15 wt % to about 20 wt % of the syrup. In other embodiments where the colorant has a higher coloring power, the colorant may be used at concentrations from about 5 wt % up to less than about 15 wt % of the syrup. Where the colorant has an even higher coloring power, the colorant may be used at concentrations from about 0.01 wt % up to less than about 5 wt % of the syrup, or from about 0.01 wt % up to less than about 3 wt % of the syrup, or from about 0.01 wt % up to less than about 2 wt % of the syrup, or from about 0.01 wt % up to less than about 1.5 wt % of the syrup, or from about 0.01 wt % up to less than about 1 wt % of the syrup.

A wide range of red and orange hues may be produced in the sucrose-based, hard panned coating by incorporating a yellow colorant along with the pH-adjusted red radish anthocyanin-containing colorant in a colored sucrose-based syrup used for coating. In general, red hues are produced when lesser amounts of the yellow colorant are incorporated, and the hue of the coating progresses from red through orange-red, red-orange, orange, and yellow-orange as the amount of yellow colorant in the syrup is increased. Therefore, the specific red or orange hue obtained in the coating may be tailored as desired by adjusting the relative amounts of the pH-adjusted red radish anthocyanin-containing colorant and the yellow colorant in the syrup.

Accordingly, in one embodiment of the present application, a yellow colorant is included in the sucrose-based, hard panned coating along with the pH-adjusted red radish anthocyanin-containing colorant. In an embodiment, the yellow colorant is a natural colorant. The source of the natural yellow colorant is turmeric in some embodiments. For example, curcuminoids from turmeric may be used. The yellow colorant may take the form of a solid, e.g., a powder; a semi-solid, e.g., a paste; or a liquid, e.g., a solution or dispersion, and is preferably provided in a form that is soluble or dispersible in water and in a sucrose-based syrup.

The yellow colorant may be admixed with the red radish anthocyanin-containing colorant or an aqueous solution of the same or a pH-adjusted form of the same before being admixed with the sucrose-based syrup. In embodiments where the yellow colorant is admixed with the red radish anthocyanin-containing colorant prior to adjusting the pH of the latter in solution, the yellow colorant is subjected to the pH adjustment along with the red radish anthocyanin-containing colorant. Alternatively, the yellow colorant may be admixed directly with the syrup before, after, or at the same time as the red radish anthocyanin-containing colorant or an aqueous solution of the same or a pH-adjusted form of the same.

The pH-adjusted red radish anthocyanin-containing colorant and the yellow colorant, whether admixed with the sucrose-based syrup as an admixture or as separate components, together provide a complete coloring material for the syrup. That is, provision of the colorants as disclosed avoids the need to adjust the pH of the bulk colored syrup to make it suitable for hard panning. As a result, the production of the sucrose-based, hard panned coating is streamlined.

The amount of the yellow colorant to be used in making the sucrose-based, hard panned coating is selected to yield the desired coloring effect. Suitable concentrations of the yellow colorant in a colored sucrose-based syrup used to prepare the coating can range from about 0.01 wt % to about 20 wt %, or from about 0.05 wt % to about 15 wt %, or from about 0.1 wt % to about 10 wt %. In embodiments where the colorant has low coloring power, the colorant may be used at concentrations from about 15 wt % to about 20 wt % of the syrup. In other embodiments where the colorant has a higher coloring power, the colorant may be used at concentrations from about 5 wt % up to less than about 15 wt % of the syrup. Where the colorant has an even higher coloring power, the colorant may be used at concentrations from about 0.01 wt % up to less than about 5 wt % of the syrup, or from about 0.01 wt % up to less than about 3 wt % of the syrup, or from about 0.01 wt % up to less than about 2 wt % of the syrup, or from about 0.01 wt % up to less than about 1.5 wt % of the syrup, or from about 0.01 wt % up to less than about 1 wt % of the syrup.

The weight ratio of red radish anthocyanin-containing colorant to yellow colorant included in a colored sucrose-based syrup may also be selected to provide the desired red or orange hue in the hard panned coating prepared with the syrup. The concentration and relative coloring power of each colorant are considered in determining an appropriate usage ratio for the two colorants. In some embodiments where a red hued coating is prepared, the weight ratio of red radish anthocyanin-containing colorant to yellow colorant is about 3:1 to about 5:1. In some embodiments where an orange hued coating is prepared, the weight ratio of red radish anthocyanin-containing colorant to yellow colorant is about 0.4:1 to about 2:1.

The sucrose-based, hard panned coating comprises sucrose from one or more sucrose-based syrups.

A base composition of sucrose solids and water makes up at least 90 percent by weight of a sucrose-based syrup. The base composition of a sucrose-based syrup may contain at least 60 wt % sucrose solids, or at least 65 wt % sucrose solids, or at least 70 wt % sucrose solids. The base composition of a syrup may contain less than 75 wt % sucrose solids, or less than 80 wt % sucrose solids. In some embodiments, the base composition of a syrup contains from 70 wt % to 80 wt % sucrose solids. The base composition of a sucrose-based syrup may be at least 60° Brix, or at least 65° Brix, or at least 70° Brix. The base composition of a syrup may be less than 75° Brix, or less than 80° Brix. In some embodiments, the base composition of a syrup is from 70° Brix to 80° Brix.

At least one sucrose-based syrup is admixed with a pH-adjusted red radish anthocyanin-containing colorant to provide a colored sucrose-based syrup. In some embodiments, at least one sucrose-based syrup is admixed with both a pH-adjusted red radish anthocyanin-containing colorant and a yellow colorant to provide a colored sucrose-based syrup.

Other sucrose-based syrups may comprise white or light-colored materials such as titanium dioxide and calcium carbonate as colorants, i.e., whiteners or lighteners, when producing a white or light-colored coating. However, these white or light-colored materials are considered to be non-colorant components when they are incorporated in still other sucrose-based syrups to serve as an opacifier in the coating.

A sucrose-based syrup may also optionally include other non-colorant components conventionally used in hard panned coatings. The total amount of non-colorant components will not exceed 10 percent by weight of the combined syrup base composition and non-colorant components. In some embodiments, the total amount of non-colorant components will not exceed 5 percent by weight, or 3 percent by weight, or 2 percent by weight, or 1 percent by weight, or 0.5 percent by weight of the combined syrup base composition and non-colorant components. Many such components are known in the art and include, but are not limited to, polyols, natural polymers, stabilizers, flavors, sensates, emulsifiers, gums, vitamins, minerals, nutraceuticals, stabilizers, or combinations of these. For example, a gum such as gum arabic may be included in a sucrose-based syrup applied directly to the edible core to be coated to fill irregularities and provide a smoother surface for later applied sucrose-based syrups, to provide a substrate that improves adhesion of subsequent sucrose-based syrup layers, or to create a barrier to oil, moisture, etc. Gums may also be included in intermediate and/or outer sucrose-based syrup layers in order to plasticize the hardened coating.

In embodiments, the sucrose-based, hard panned coating comprises multiple sucrose-based syrup layers, and the pH-adjusted red radish anthocyanin-containing colorant is present in at least one of the sucrose-based syrup layers. In some of these embodiments, the sucrose-based, hard panned coating further comprises a yellow colorant, and the yellow colorant is present in one or more of the same sucrose-based syrup layers as the pH-adjusted red radish anthocyanin-containing colorant. In other embodiments of the multilayered coating further comprising the yellow colorant, the yellow colorant and the pH-adjusted red radish anthocyanin-containing colorant are in different layers.

Some of the multiple sucrose-based syrup layers may have the same syrup formulations, while other layers may have different formulations. For example, 3 to 30 layers of a colored sucrose-based syrup may form a portion of the coating, and 3 to 30 layers of an uncolored sucrose-based syrup may form another portion of the coating. Layers with the same syrup formulation may be next to each other or separated by layers with different formulations, and the order of the layers may vary through the multilayered coating. In one embodiment, the pH-adjusted red radish anthocyanin-containing colorant is present in at least the outermost sucrose-based syrup layer of the multilayered coating. In other embodiments, the pH-adjusted red radish anthocyanin-containing colorant is present in at least the outermost 5, or at least the outermost 10, or at least the outermost 15, or at least the outermost 20, or at least the outermost 30 sucrose-based syrup layers of the multilayered coating.

In embodiments, the total number of sucrose-based syrup layers (uncolored or colored) in the sucrose-based, hard panned coating is fewer than 50, or fewer than 40, or fewer than 30 layers. In some of these and other embodiments, the number of sucrose-based syrup layers in the coating is greater than 10, or greater than 15, or greater than 20 layers. The total number of sucrose-based syrup layers in the coating may suitably be from 10 to 50, or from 15 to 40, or from 20 to 30 layers.

Once hardened, the hard panned coating may be expected to have a thickness of no more than 3.0 mm, or no more than 2.5 mm, or no more than 2.0 mm, or no more than 1.5 mm, or no more than 1.0 mm. The hard panned coating may also have a thickness of greater than 0.1 mm or greater than 0.2 mm, or greater than 0.3 mm, or greater than 0.4 mm, or greater than 0.5 mm. In some embodiments, the hard panned coating may have a thickness of from 0.1 mm to 3.0 mm, or from 0.2 mm to 2.5 mm, or from 0.3 mm to 2.0 mm, or from 0.4 mm to 1.5 mm, or from 0.5 mm to 1.0 mm.

The sucrose-based, hard panned coating is substantially crystalline. In particular embodiments, at least 85% by volume of the coating is crystalline; or at least 87% by volume, or at least 89% by volume, or at least 91% by volume, or at least 93% by volume, or at least 95% by volume, or from 85% to 100% by volume, or from 87% to 100% by volume, or from 89% to 100% by volume, or from 91% to 100% by volume, or from 93% to 100% by volume, or from 95% to 100% by volume of the coating is crystalline.

The sucrose-based, hard panned coatings provided herein have a red or orange hue contributed at least in part by a pH-adjusted red radish anthocyanin-containing colorant. A yellow colorant also contributes components of the red or orange hue in some embodiments.

Colors characterized by the same hue may vary in both chroma (purity of color) and value (lightness or darkness). Therefore, colors of the same hue may be perceived differently by the eye and commonly described by different names. For example, two colors having the same red hue but different chroma and/or value may be perceived and described as red in one instance and as pink in the other instance. Similarly, two colors having the same hue falling somewhere between red and yellow may be perceived and described as orange in one instance and as tangerine in the other instance. On the other hand, two colors having different but relatively close hues may be perceived and described as being part of the same hue family, e.g., an apple red and a brick red. Therefore, it is to be understood that the terms, "red hue" and "orange hue," do not signify single colors, but rather, are characteristics of a broad range of colors described by different names, but all having hues in the red and orange families.

The color property, hue, may be modeled and described in terms of an h° coordinate, or hue angle, h°, in the CIE 1976 CIELCH color model system. h° is specified as an angle from 0° to 360° moving counterclockwise around the L* (value) axis. As defined by the model, pure red has a hue angle of 0°, pure yellow has a hue angle of 90°, pure green has a hue angle of 180°, and pure blue has a hue angle of 270°. Hue angles between any two of these anchor points represent a continuous spectrum of 'blended' hues between the two pure hues. Therefore, it is possible to model and numerically describe hues in color space, including 'blended' hues such as orange that arise from the 'blending' of red and yellow.

In an embodiment, the red or orange hue of the sucrose-based, hard panned coating is described by a CIELCH color space h° coordinate, or hue angle, h°, of from about 15° to about 70°. In some embodiments, when a strong yellow component is not desired in an orange hue, the hue angle is in the range of from about 15° to about 60°. Another orange hued embodiment of the coating has a hue angle in the range of from about 40° to about 50°. In other embodiments where a red hue is desired, lower hue angles may not provide an added benefit, and the hue angle is in the range of from about 20° to about 70°. Another red hued embodiment of the coating has a hue angle in the range of from about 20° to about 30°. A hue angle in the range of from about 20° to about 60° may be desirable in still other embodiments of the red or orange hued coating.

In some embodiments, the chroma of the sucrose-based, hard panned coating is described by a CIELCH color space C* coordinate of at least about 20, or at least about 22, or at least about 24, or at least about 26, or at least about 28, or at least about 30, or from about 20 to about 80.

In another embodiment, the color of the sucrose-based, hard panned coating has a ΔE color difference of 10 or less compared to the color of a sucrose-based, hard panned coating colored with the synthetic red colorant, FD&C Red No. 40. In some embodiments, the ΔE is 8 or less, or 6 or less, or as low as 4 or less.

In another embodiment disclosed herein, a hard panned confection comprises an edible core and a sucrose-based, hard panned coating, wherein the coating comprises sucrose and a pH-adjusted red radish anthocyanin-containing colorant. The coating is substantially crystalline and has a red or orange hue described by a CIELCH color space h° coordinate of from about 15° to about 70°.

The sucrose-based, hard panned coating of the hard panned confection may be provided according to any of the coating embodiments disclosed in the present application. The sucrose in the coating may be provided by one or more sucrose-based syrups used to prepare the coating. A red radish anthocyanin-containing colorant may be pH adjusted in aqueous solution to a pH of from about 4 to about 6, and the water content of the solution optionally reduced, to provide the pH-adjusted red radish anthocyanin-containing colorant in the coating. The coating may further comprise a yellow colorant.

In some embodiments of the hard panned confection, the coating comprises multiple sucrose-based syrup layers, and the pH-adjusted red radish anthocyanin-containing colorant is present in at least one of the sucrose-based syrup layers. In some of these embodiments, the sucrose-based, hard panned coating further comprises a yellow colorant, and the yellow colorant is present in one or more of the same sucrose-based syrup layers as the pH-adjusted red radish anthocyanin-containing colorant. In other embodiments of the multilayered coating further comprising the yellow colorant, the yellow colorant and the pH-adjusted red radish anthocyanin-containing colorant are in different layers.

The red radish anthocyanin-containing colorant in the coating of the hard panned confection may be a natural colorant. In embodiments where the coating of the hard panned confection comprises a yellow colorant, the yellow colorant may be a natural colorant, and the source of such a natural yellow colorant may be turmeric. The coating of the hard panned confection may be free of synthetic red colorants, lycopene, β-carotene, carmine, and betalains and/or free of colorants capable of providing a red hue other than the red radish anthocyanin-containing colorant.

The coating of the hard panned confection is substantially crystalline. In particular embodiments of the hard panned confection, at least 85% by volume of the sucrose-based, hard panned coating is crystalline; or at least 87% by volume, or at least 89% by volume, or at least 91% by volume, or at least 93% by volume, or at least 95% by volume, or from 85% to 100% by volume, or from 87% to 100% by volume, or from 89% to 100% by volume, or from 91% to 100% by volume, or from 93% to 100% by volume, or from 95% to 100% by volume of the coating is crystalline.

In some embodiments, the sucrose-based, hard panned coating of the hard panned confection has a red or orange hue described by a CIELCH color space h° coordinate of from about 15° to about 70°. In other embodiments, the chroma of the coating is described by a CIELCH color space $C^*$ coordinate of at least 20. In these and other embodiments, the color of the coating may have a $\Delta E$ color difference of 10 or less compared to the color of a sucrose-based, hard panned coating colored with the synthetic red colorant, FD&C Red No. 40.

In some embodiments of the hard panned confection, sucrose-based syrups may be applied as coating layers directly to the surface of the edible core to form the sucrose-based, hard panned coating. In other embodiments, sucrose-based syrups may be applied as coating layers to a prepared surface of the edible core, wherein the surface has been prepared according to a known technique including, but not limited to, gumming, isolating, and stabilizing. In still other embodiments, sucrose-based syrups may be applied as coating layers to a crystallized sucrose-based syrup layer overlying any number of coating layers overlying the edible core. As the phrase that follows in quotation marks is used herein, the application of a sucrose-based syrup as a coating layer "to an edible core" does not necessarily denote that the sucrose-based syrup is applied directly to the edible core. Rather, a sucrose-based syrup that is applied as a coating layer "to an edible core" may be applied directly to the surface of the edible core, or to a prepared surface of an edible core, or to a crystallized sucrose-based syrup layer overlying any number of coating layers overlying the edible core, within the meaning of the phrase.

The sucrose-based syrup layers may be applied to any desired edible core. In some embodiments, the edible core may comprise a natural center, such as a nut, groundnut, nut meat, nut paste, dried fruit piece, or dried fruit paste. Or, the edible core may comprise a confection, such as a boiled sugar syrup, caramel, nougat, taffy, toffee, fondant, chocolate, confectionery coating, or combinations of these. Alternatively, the edible core may comprise a grain-based item, such as a cookie, pretzel, biscuit, wafer, cracker, or other baked, crisped, or puffed material. In some embodiments, the edible core may comprise a natural center, confection, or grain-based item which is then coated with a confection.

In an embodiment of the hard panned confection, the sucrose-based, hard panned coating substantially surrounds the edible core. That is, although a pinhole, crack, or chip may exist in the coating, the coating traverses the entire outer surface of the core.

In yet another embodiment of the present application, a method of hard pan coating an edible core is disclosed.

The method comprises:
(a) admixing a red radish anthocyanin-containing colorant with water to form an aqueous colorant solution;
(b) adjusting the pH of the aqueous colorant solution to from about 4 to about 6, and, optionally, reducing the water content of the solution to form a pH-adjusted colorant;
(c) admixing the pH-adjusted colorant with a sucrose-based syrup to form a colored sucrose-based syrup;
(d) admixing a yellow colorant with one or more constituents and admixtures of steps (a), (b), and (c) such that the yellow colorant is incorporated into the colored sucrose-based syrup; and
(e) applying the colored sucrose-based syrup to an edible core to provide at least one layer of a hard panned coating.

For performing the method, the red radish anthocyanin-containing colorant, yellow colorant, sucrose-based syrup, and edible core may be provided according to any of the embodiments disclosed in the present application.

In embodiments, the mixing steps of the method may be performed using conventional food processing techniques and equipment, e.g., mixing powders into fluids in a 316 stainless steel vessel with an agitator.

The water used to prepare the aqueous colorant solution of step (a) and the sucrose-based syrup is desirably reduced in ion content or deionized in some embodiments. Water is admixed with the red radish anthocyanin-containing colorant in an amount sufficient to dissolve or disperse the colorant. A suitable amount of water may be a volume in milliliters that is twice the numerical mass in grams of the colorant, e.g., 30 ml water with 15 g colorant. In an embodiment, the aqueous colorant solution is prepared under ambient conditions without heating the constituent materials.

The pH of the aqueous colorant solution is adjusted to from about 4 to about 6 to create a pH-adjusted red radish anthocyanin-containing colorant in the form of an aqueous solution. In some embodiments, the pH of the aqueous colorant solution is adjusted to from about 4.25 to about 6, or from about 4.5 to about 6, or from about 4.75 to about 6, or from about 5 to about 6. In other embodiments, a food-grade pH adjusting agent is admixed with the aqueous colorant solution in an amount necessary to adjust the pH of the solution to from about 4 to about 6. The pH adjusting agent may be provided in any water-soluble form, e.g., as solid particles or in aqueous solution. If the pH adjusting agent is provided in aqueous solution, the water of solution is desirably reduced in ion content or deionized in some embodiments. In one embodiment, the pH adjustment is performed under ambient conditions without heating the constituent materials.

The food-grade pH adjusting agent, in an embodiment, is a strong base which substantially dissociates in water; that is, the percent dissociation of the agent in water is at least about 95%, or at least about 96%, or at least about 97%, or at least about 98%, or at least about 99%, or from about 95% to about 99.99%, or from about 98% to about 99.99%. The strong base does not act as a buffer, but substantially dissociates and adjusts the pH of the aqueous colorant solution. In some embodiments, the pH adjusting agent which is a strong base is admixed with the aqueous colorant solution in an amount of from about 0.5 wt % to about 10 wt %, where the weight percentage of the agent is by weight of the red radish anthocyanin-containing colorant. In other embodiments, the amount of the pH adjusting agent is from about 0.5 wt % to about 8 wt %, or from about 0.5 wt % to about 6 wt %, or from about 0.5 wt % to about 5 wt %, or from about 1 wt % to about 6 wt %, or from about 2 wt % to about 5 wt %, where the weight percentage of the agent is by weight of the colorant.

The strong bases, sodium hydroxide and potassium hydroxide, are preferred food-grade pH adjusting agents, in particular embodiments, because of their ability to adjust the pH of the aqueous colorant solution without contributing noticeable odor or flavor and without interacting with the colorant in a way that shifts hue away from the intended target. In a preferred embodiment, the food-grade pH adjusting agent is sodium hydroxide.

In some embodiments, the water content of the prepared aqueous colorant solution, after pH adjustment of the solution, may optionally be reduced by any suitable process, such as a drying process or a separations process, to create the pH-adjusted red radish anthocyanin-containing colorant in the form of a semi-solid or solid.

The yellow colorant, in embodiments of step (d), may be admixed with one or more constituents and admixtures of steps (a), (b), and (c), including the red radish anthocyanin-containing colorant, the water of solution for the colorant, the aqueous colorant solution, the pH-adjusted colorant, the sucrose-based syrup, and the colored sucrose-based syrup, as a means for incorporating the yellow colorant into the colored sucrose-based syrup.

In one embodiment, the yellow colorant is admixed with the red radish anthocyanin-containing colorant, the water of solution for the colorant, the aqueous colorant solution, or the pH-adjusted colorant before the pH-adjusted colorant is admixed with the sucrose-based syrup. In another embodiment, the yellow colorant is admixed with the sucrose-based syrup before, after, or at the same time as admixing the pH-adjusted colorant with the sucrose-based syrup.

The pH-adjusted red radish anthocyanin-containing colorant and the yellow colorant, whether admixed with the sucrose-based syrup as an admixture or as separate components according to steps (c) and (d), together provide a complete coloring material for the syrup. That is, provision of the colorants according to the disclosed method avoids the need to adjust the pH of the bulk colored syrup to make it suitable for hard panning. As a result, the overall hard pan coating method is streamlined.

In an embodiment, the pH-adjusted red radish anthocyanin-containing colorant and the yellow colorant are admixed with the sucrose-based syrup when the syrup is at a temperature in the range from about 65° C. to about 85° C., or from about 67° C. to about 83° C., or from about 70° C. to about 80° C., or from about 74° C. to about 82° C.

In some embodiments, the red radish anthocyanin-containing colorant is incorporated into the colored sucrose-based syrup in an amount of from about 0.01 wt % up to less than about 5 wt % of the colored sucrose-based syrup. In these and other embodiments, the yellow colorant is incorporated into the colored sucrose-based syrup in an amount of from about 0.01 wt % up to less than about 5 wt % of the colored sucrose-based syrup.

The colored sucrose-based syrup is applied to the desired edible core to provide at least one layer of the hard panned coating according to conventional hard pan coating, or hard panning, processes known in the art, in some embodiments. Generally speaking, in a hard panning process, multiple applications of one or more highly concentrated sugar syrups are used to build up a sugar coating on an edible product core. Some of the highly concentrated sugar syrups may contain one or more colorants, while others may not. In embodiments, the hard panning process comprises the repetitive application of thin layers of the coating materials onto an intermixed mass of centers, while mixing the mass of centers, and the drying of each layer of coating material, during which the sugar in the coating material crystallizes between the applications of layers. The successive phases of coating material application and drying are carried out, for example, in a rotating pan, drum, or similar apparatus, and the process is tailored to give a finished coating with the desired thickness, surface appearance, opacity, and organoleptic and other properties. Such processes are described, for example, in "Sugar Confectionery and Chocolate Manufacture, R. Lees and E. B. Jackson, Chemical Publishing Company, Feb. 7, 1975, and "Industrial Chocolate Manufacture and Use," editor, S. T. Beckett, Blackie & Son Ltd., Glasgow, 1988, each hereby incorporated herein by reference in its entirety for any and all purposes. Hard panning is distinguished herein from a soft panning process, at least in part because the hard panning process does not include applying particulate solids such as crystalline sugar to the syrup-wetted centers to dry the coating. In other embodiments, the colored sucrose-based syrup is applied to the edible core according to a non-conventional hard pan coating, or hard panning, process that substantially replicates the properties of a conventionally hard panned coating.

In some embodiments, the method of hard pan coating the edible core further comprises applying the colored sucrose-based syrup to the edible core to provide multiple layers of a hard panned coating. Whether applying one or multiple layers to the core, the colored sucrose-based syrup may be applied at a temperature in the range from about 65° C. to about 85° C., or from about 67° C. to about 83° C., or from about 70° C. to about 80° C., or from about 74° C. to about 82° C.

The method of hard pan coating the edible core may further comprise crystallizing the colored sucrose-based syrup after it is applied such that the at least one layer of the hard panned coating is substantially crystalline. In some embodiments, at least 85% by volume of the at least one layer of the hard panned coating is crystalline; or at least 87% by volume, or at least 89% by volume, or at least 91% by volume, or at least 93% by volume, or at least 95% by volume, or from 85% to 100% by volume, or from 87% to 100% by volume, or from 89% to 100% by volume, or from 91% to 100% by volume, or from 93% to 100% by volume, or from 95% to 100% by volume of the at least one layer of the hard panned coating is crystalline. In an embodiment, the colored sucrose-based syrup is crystallized by subjecting it to conditions which promote a phase change of the sucrose. For example, the syrup-coated cores may be tumbled and mixed in a rotating pan to promote crystallization.

In some embodiments, the method of hard pan coating the edible core further comprises at least partially drying the colored sucrose-based syrup after it is applied. In other embodiments, the colored sucrose-based syrup is applied to a prepared surface of the edible core.

Specific embodiments will now be demonstrated by reference to the following examples. It should be understood that the examples are disclosed solely for the purpose of illustration, and variations to these embodiments are anticipated.

EXAMPLE 1

Hard Panned Confections Colored Red with a Natural Red Radish Anthocyanin-Containing Colorant and a Natural Yellow Colorant Sucrose-based coatings were applied to lentil-shaped chocolate centers by a hard panning process. A 74° Brix base sucrose syrup was prepared with deionized water. A first coating syrup was prepared with the base sucrose syrup and 2.5 wt % titanium dioxide added as an opacifier. An aqueous solution of a natural red radish anthocyanin-containing colorant ("NRRA-1") was prepared by dissolving 8 grams of a natural red radish anthocyanin-containing powder (San Red ADF-EX, San-Ei Gen F. F. I. (USA), Inc., New York, N.Y.) in 16 ml of deionized water and adjusting to a pH of 5 with 2 M NaOH. A second coating syrup was prepared with the base sucrose syrup and the pH-adjusted, aqueous solution of natural red radish anthocyanin-containing colorant added so that the natural red radish anthocyanin-containing powder was incorporated in the syrup at 0.4 wt %. A natural yellow colorant powder (CH Cap Colors Turmeric WSS-P-500, Chr. Hansen, Inc., Milwaukee, Wis.) was then mixed into the second coating syrup at 0.1 wt %. The first coating syrup containing titanium dioxide was applied to the centers and dried in 5 layers. The colored second coating syrup was then applied to the centers and dried in 17 layers. The colored centers were finished with a coating of a polishing gum followed by a wax.

The above process was repeated with an alternative second coating syrup prepared with 0.25 wt % of the same natural yellow colorant powder and 0.8 wt % of an alternative natural red radish anthocyanin-containing powder (CH Red Radish, Chr. Hansen, Inc., Milwaukee, Wis.). The alternative natural red radish anthocyanin-containing powder was provided to the alternative second coating syrup in an aqueous solution of 16 grams of powder in 32 ml of deionized water, adjusted to a pH of 5 with 2 M NaOH (solution "NRRA-2"). The process was again repeated with another alternative second coating syrup prepared with the base sucrose syrup and the synthetic red colorant, FD&C Red No. 40. The first coating syrup and finishing coats were the same for the second and third trials as for the first trial.

Color measurements were performed and L*a*b*C*h° values calculated and averaged for 10 confectionery pieces from each trial, as shown in Table 1:

Table 1 shows ΔE color difference values for the natural colorant trial samples compared to the synthetic colorant trial sample. All three samples had a red hue. The NRRA-2 red radish anthocyanin-containing colorant produced a closer red hue to that provided by the synthetic colorant than the NRRA-1 red radish anthocyanin-containing colorant, as indicated by the lower ΔE value of 7.51.

EXAMPLE 2

Hard Panned Confections Colored Orange with a Natural Red Radish Anthocyanin-Containing Colorant and a Natural Yellow Colorant Sucrose-based coatings were applied to lentil-shaped chocolate centers by a hard panning process. A 74° Brix base sucrose syrup was prepared with deionized water. A first coating syrup was prepared with the base sucrose syrup and 2.5 wt % titanium dioxide added as an opacifier. An aqueous solution of a natural red radish anthocyanin-containing colorant ("NRRA-3") was prepared by dissolving 4 grams of a natural red radish anthocyanin-containing powder (San Red ADF-EX, San-Ei Gen F. F. I. (USA), Inc., New York, N.Y.) in 8 ml of deionized water and adjusting to a pH of 5 with 2 M NaOH. A second coating syrup was prepared with the base sucrose syrup and the pH-adjusted, aqueous solution of natural red radish anthocyanin-containing colorant added so that the natural red radish anthocyanin-containing powder was incorporated in the syrup at 0.2 wt %. A natural yellow colorant powder (CH Cap Colors Turmeric WSS-P-500, Chr. Hansen, Inc., Milwaukee, Wis.) was then mixed into the second coating syrup at 0.2 wt %. The first coating syrup containing titanium dioxide was applied to the centers and dried in 5 layers. The colored second coating syrup was then applied to the centers and dried in 17 layers. The colored centers were finished with a coating of a polishing gum followed by a wax.

The above process was repeated with an alternative second coating syrup prepared with 0.4 wt % of the same natural yellow colorant powder and 0.175 wt % of an alternative natural red radish anthocyanin-containing powder (CH Red Radish, Chr. Hansen, Inc., Milwaukee, Wis.). The alternative natural red radish anthocyanin-containing powder was provided to the alternative second coating syrup in an aqueous solution of 3.5 grams of powder in 7 ml of deionized water, adjusted to a pH of 5 with 2 M NaOH (solution "NRRA-4"). The process was again repeated with another alternative second coating syrup prepared with the base sucrose syrup and a mixture of synthetic FD&C colorants selected to produce a vivid orange hue. The first coating syrup and finishing coats were the same for the second and third trials as for the first trial.

Color measurements were performed and L*a*b*C*h° values calculated and averaged for 10 confectionery pieces from each trial, as shown in Table 2:

TABLE 1

| Sample Name | L* | a* | b* | C* | h° | ΔE compared to sample with synthetic FD&C Red No. 40 |
|---|---|---|---|---|---|---|
| NRRA-1 and Natural Yellow Colorant | 49.98 | 31.02 | 12.83 | 33.57 | 22.47 | 20.28 |
| NRRA-2 and Natural Yellow Colorant | 39.06 | 38.77 | 16.55 | 42.16 | 23.12 | 7.51 |
| Synthetic FD&C Red No. 40 | 37.09 | 44.05 | 21.52 | 49.03 | 26.04 | — |

TABLE 2

| Sample Name | L* | a* | b* | C* | h° | ΔE compared to sample with synthetic FD&C colorant mixture |
|---|---|---|---|---|---|---|
| NRRA-3 and Natural Yellow Colorant | 58.52 | 24.09 | 32.79 | 40.69 | 53.70 | 33.21 |
| NRRA-4 and Natural Yellow Colorant | 59.09 | 28.86 | 43.08 | 51.85 | 56.18 | 24.31 |
| Synthetic FD&C Colorant Mixture | 58.81 | 51.82 | 51.06 | 72.75 | 44.58 | — |

Table 2 shows ΔE color difference values for the natural colorant trial samples compared to the synthetic colorant trial sample. All three samples had an orange hue. The NRRA-4 red radish anthocyanin-containing colorant produced a closer orange hue to that provided by the synthetic colorant than the NRRA-3 red radish anthocyanin-containing colorant, as indicated by the lower ΔE value of 24.31.

EXAMPLE 3

Hard Panned Confection Colored with a Natural Red Radish Anthocyanin-Containing Colorant Adjusted to pH 9

A sucrose-based coating was applied to lentil-shaped chocolate centers by a hard panning process. A 74° Brix base sucrose syrup was prepared with deionized water. A first coating syrup was prepared with the base sucrose syrup and 2.5 wt % titanium dioxide added as an opacifier. An aqueous solution of a natural red radish anthocyanin-containing colorant ("NRRA-5") was prepared by dissolving 14 grams of a natural red radish anthocyanin-containing powder (San Red AD-DS, San-Ei Gen F. F. I. (USA), Inc., New York, N.Y.) in 28 ml of deionized water and adjusting to a pH of 9 with 2 M NaOH. A second coating syrup was prepared with the base sucrose syrup and the pH-adjusted, aqueous solution of natural red radish anthocyanin-containing colorant added so that the natural red radish anthocyanin-containing powder was incorporated in the syrup at 0.7 wt %. The first coating syrup containing titanium dioxide was applied to the centers and dried in 5 layers. The colored second coating syrup was then applied to the centers and dried in 17 layers. The colored centers were finished with a coating of a polishing gum followed by a wax.

Color measurements were performed and L*a*b*C*h° values calculated and averaged for 10 confectionery pieces from the trial, as shown in Table 3:

TABLE 3

| Sample Name | L* | a* | b* | C* | h° |
|---|---|---|---|---|---|
| NRRA-5 (pH 9) | 31.72 | 8.09 | −8.96 | 12.07 | 312.08 |

Table 3 shows that the NRRA-5 red radish anthocyanin-containing colorant adjusted to a pH of 9 provided a violet hue to the trial sample.

Other variations and modifications of the embodiments will be obvious to those skilled in this art. The scope of protection is not to be limited except as set forth in the following claims.

The invention claimed is:

1. A sucrose-based, hard panned coating comprising sucrose and a red radish anthocyanin-containing colorant, wherein the red radish anthocvanin-containing colorant is pH-adjusted in aqueous solution to a pH of from about 4 to about 6 and the water content of the solution, is optionally reduced to provide the pH-adjusted red radish anthocyanin-containing colorant, and
wherein the coating is substantially crystalline and has a red or orange hue described by a CIELCH color space h° coordinate of from about 15° to about 70°.

2. The sucrose-based. hard panned coating of claim 1, wherein at least 85% by volume of the coating is crystalline.

3. A hard panned confection comprising an edible core and the sucrose-based, hard panned coating of claim 2.

4. The sucrose-based, hard panned coating of claim 1 further comprising yellow colorant.

5. The sucrose-based, hard panned coating of claim 1, wherein the chroma of the coating is described by a CIELCH color space C* coordinate of at least about 20.

6. The sucrose-based, hard panned coating of claim 1, wherein the color of the coating has a ΔE color difference of 10 or less compared to the color of a sucrose-based, hard panned coating colored with the synthetic red colorant, FD&C Red No. 40.

7. A hard panned confection comprising an edible core and the sucrose-based, hard panned coating of claim 1.

8. The sucrose-based, hard panned coating of claim 1, wherein the coating comprises multiple sucrose-based syrup layers, and the pH-adjusted red radish anthocyanin-comprising colorant is present in at least one of the sucrose-based syrup layers.

9. The sucrose-based, hard panned coating of claim 8, further comprising a yellow colorant.

10. A hard panned confection comprising an edible core and the sucrose-based, hard panned coating of claim 8.

11. The sucrose-based, hard panned coating of claim 8, wherein the coating further comprises a yellow colorant, and the yellow colorant is present in one or more of the same sucrose-based syrup layers as the pH-adjusted red radish anthocyanin-containing colorant.

12. A hard panned confection comprising an edible core and the sucrose-based, hard panned coating of claim 11.

* * * * *